(12) United States Patent
Tsujii (10) Patent No.: US 10,348,188 B2
(45) Date of Patent: Jul. 9, 2019

(54) VEHICLE AND CONTROL METHOD THEREFOR

(71) Applicant: TOYOTA JIDOSHA KABUSHIKI KAISHA, Toyota-shi, Aichi-ken (JP)

(72) Inventor: Shintaro Tsujii, Chiryu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/960,595

(22) Filed: Apr. 24, 2018

(65) Prior Publication Data
US 2018/0316259 A1 Nov. 1, 2018

(30) Foreign Application Priority Data

Apr. 27, 2017 (JP) .................. 2017-088480

(51) Int. Cl.
| | |
|---|---|
| B60L 3/00 | (2019.01) |
| H02M 1/00 | (2006.01) |
| H02M 1/32 | (2007.01) |
| H02M 1/36 | (2007.01) |
| B60L 50/51 | (2019.01) |
| H02M 3/156 | (2006.01) |
| H02M 3/158 | (2006.01) |
| H02P 27/08 | (2006.01) |
| H02P 29/024 | (2016.01) |

(52) U.S. Cl.
CPC ............. *H02M 1/32* (2013.01); *B60L 3/0023* (2013.01); *B60L 50/51* (2019.02); *H02M 1/36* (2013.01); *H02M 3/158* (2013.01); *H02P 27/08* (2013.01); *H02P 29/024* (2013.01); *H02M 3/156* (2013.01); *H02M 2001/0009* (2013.01); *H02M 2001/325* (2013.01); *H02P 2201/07* (2013.01)

(58) Field of Classification Search
CPC ........................................................ H02M 1/32
USPC .................................................. 318/139, 34
See application file for complete search history.

(56) References Cited

U.S. PATENT DOCUMENTS 8,220,574 B2 * 7/2012 Nozawa ............ H02M 7/53873
180/65.21
2015/0263624 A1 9/2015 Nobe et al.

FOREIGN PATENT DOCUMENTS

JP 2015-177609 A 10/2015

* cited by examiner

*Primary Examiner* — David Luo
(74) *Attorney, Agent, or Firm* — Sughrue Mion, PLLC (57) ABSTRACT

When an abnormality occurs in a first voltage sensor that detects a voltage of a power line on a high voltage side or a second voltage sensor that detects a voltage of a power line on a low voltage side, an estimated voltage of the power line on the high voltage side is calculated based on a detected current of a reactor that is detected by a current sensor that detects a current of the reactor as the detected current, and a step-up converter is controlled using the estimated voltage of the power line on the high voltage side.

8 Claims, 6 Drawing Sheets

VEHICLE AND CONTROL METHOD THEREFOR

CROSS-REFERENCE TO RELATED APPLICATIONS

This application claims priority to Japanese Patent Application No. 2017-088480 filed on Apr. 27, 2017, which is incorporated herein by reference in its entirety.

BACKGROUND

1. Technical Field

The disclosure relates to a vehicle and a control method therefor and more particularly to a vehicle including a motor, an inverter, a power storage device, a step-up converter, two voltage sensors, and a current sensor and a control method therefor.

2. Description of Related Art

In the related art, a vehicle including a traveling motor, an inverter that drives the motor, a battery, a converter that includes switching elements of an upper arm and a lower arm and a reactor and can perform a step-up operation of stepping up electric power on the battery side and supplying the stepped-up power to the inverter side, a battery voltage sensor that detects a voltage of the battery, an input voltage sensor that detects an input voltage of the converter, and an input current sensor that detects an input current of the converter has been proposed (for example, see Japanese Unexamined Patent Application Publication No. 2015-177609 (JP 2015-177609 A)). In this vehicle, an abnormality having occurred in the battery voltage sensor or the input voltage sensor is determined based on an estimated input voltage value calculated based on the input current of the converter, the input voltage of the converter, and the voltage of the battery without stopping the step-up operation of the converter. When it is determined that an abnormality has occurred in the input voltage sensor, a detected value from the battery voltage sensor is used for step-up control of the converter instead of a detected value from the input voltage sensor.

SUMMARY

In the vehicle, when an abnormality occurs in an output voltage sensor that detects an output voltage of the converter, the output voltage of the converter cannot be acquired (estimated) and thus the step-up operation of the converter cannot be appropriately performed. In this case, supplying electric power from the battery to the motor to allow the vehicle to travel in a limp home mode without performing the step-up operation of the converter by maintaining the upper arm of the converter in an ON state or the like can be considered, but a voltage applied to the inverter (the motor) is low and thus a torque which can be output from the motor decreases.

Therefore, the disclosure provides a vehicle including a step-up converter that can perform a step-up operation of stepping up electric power of power lines on a low voltage side connected to a power storage device and supplying the stepped-up power to power lines on a high voltage side connected to an inverter, in which the step-up operation of the step-up converter can be appropriately performed even when an abnormality occurs in a first voltage sensor that detects a voltage of the power lines on the high voltage side or a second voltage sensor that detects voltage of the power lines on the low voltage side, and a control method for the vehicle.

Therefore, according to an aspect of the disclosure, there is provided a vehicle including: a motor configured to drive the vehicle; an inverter configured to drive the motor; a power storage device; a step-up converter including switching elements of an upper arm and a lower arm and a reactor, the step-up converter being configured to perform a step-up operation of stepping up electric power of a power line on a low voltage side connected to the power storage device and supplying the stepped-up electric power to a power line on a high voltage side connected to the inverter; a first voltage sensor configured to detect a voltage of the power line on the high voltage side; a second voltage sensor configured to detect a voltage of the power line on the low voltage side; a current sensor configured to detect a current of the reactor as a detected current; and an electronic control unit. The electronic control unit is configured to: (i) control the inverter and the step-up converter, (ii) calculate an estimated voltage of the power line on the high voltage side based on the detected current of the reactor when an abnormality occurs in the first voltage sensor or the second voltage sensor, and (iii) control the step-up converter using the estimated voltage of the power line on the high voltage side.

According to another aspect of the disclosure, there is provided a control method for a vehicle. The vehicle includes a motor configured to drive the vehicle, an inverter configured to drive the motor, a power storage device, a step-up converter including switching elements of an upper arm and a lower arm and a reactor, the step-up converter being configured to perform a step-up operation of stepping up electric power of a power line on a low voltage side connected to the power storage device and supplying the stepped-up electric power to a power line on a high voltage side connected to the inverter, a first voltage sensor configured to detect a voltage of the power line on the high voltage side, a second voltage sensor configured to detect a voltage of the power line on the low voltage side, and a current sensor configured to detect a current of the reactor as a detected current. The control method includes: (i) controlling the inverter and the step-up converter; (ii) calculating an estimated voltage of the power line on the high voltage side based on the detected current of the reactor when an abnormality occurs in the first voltage sensor or the second voltage sensor; and (iii) controlling the step-up converter using the estimated voltage of the power line on the high voltage side.

In the vehicle and the control method therefor according to the disclosure, when an abnormality occurs in the first voltage sensor that detects the voltage of the power line on the high voltage side or the second voltage sensor that detects the voltage of the power line on the low voltage side, the estimated voltage of the power line on the high voltage side is calculated based on the detected current of the reactor which is detected by the current sensor that detects the current of the reactor as the detected current, and the step-up converter is controlled using the estimated voltage of the power line on the high voltage side. Accordingly, even when an abnormality occurs in the first voltage sensor or the second voltage sensor, it is possible to acquire the estimated voltage of the power line on the high voltage side and to appropriately perform the step-up operation of the step-up converter.

In the vehicle according to the disclosure, the electronic control unit may be configured to calculate the estimated voltage of the power line on the high voltage side based on changes of the detected current of the reactor per unit time in increase and decrease of the detected current when an abnormality occurs in the first voltage sensor or the second voltage sensor. With this vehicle, it is possible to calculate the estimated voltage of the power line on the high voltage side based on the changes of the detected current of the reactor per unit time in increase and decrease of the detected current.

In the vehicle, the electronic control unit may be configured to calculate the estimated voltage VHest of the power line on the high voltage side by "VHest=L×(ΔIL1−ΔIL2)/Δt" where "Δt" denotes the unit time, "ΔIL1" and "ΔIL2" deote the changes of the detected current of the reactor per unit time in increase and decrease of the detected current, "L" denotes inductance of the reactor, and "VHest" denotes the estimated voltage of the power line on the high voltage side.

In the vehicle, the electronic control unit may be configured to: (i) set a target duty ratio based on the estimated voltage and a target voltage of the power line on the high voltage side; (ii) control the step-up converter using the target duty ratio; and (iii) set the target duty ratio such that an ON time and an OFF time of the upper arm are longer than the unit time based on the estimated voltage and the target voltage of the power line on the high voltage side when an abnormality occurs in the first voltage sensor or the second voltage sensor. With this vehicle, when the "unit time" is equal to an acquisition interval of the detected current of the reactor, it is possible to appropriately calculate the changes of the detected current of the reactor per unit time in increase and decrease of the detected current.

In the vehicle, the electronic control unit may be configured: (i) to control the inverter in a PWM control mode or a rectangular wave control mode; and (ii) to control the step-up converter such that the upper arm is maintained in an ON state when an abnormality occurs in the first voltage sensor or the second voltage sensor and to start the step-up operation of the step-up converter when the upper arm of the step-up converter is maintained in the ON state and the inverter is controlled in the PWM control mode. With this vehicle, when an abnormality occurs in the first voltage sensor or the second voltage sensor, the upper arm of the step-up converter is maintained in the ON state, and the inverter is controlled in the PWM control mode, it is possible to start the step-up operation of the step-up converter.

In the vehicle, the electronic control unit may be configured to start the step-up operation of the step-up converter when an abnormality occurs in the first voltage sensor or the second voltage sensor, the upper arm of the step-up converter is maintained in the ON state, the inverter is controlled in the PWM control mode, and a modulation factor is equal to or greater than a predetermined modulation factor. With this vehicle, it is possible to further curb a decrease in controllability of the motor in comparison with a case in which the step-up operation of the step-up converter is started when the inverter is controlled in the rectangular wave control mode.

In the vehicle, the electronic control unit may be configured to start the step-up operation of the step-up converter when an abnormality occurs in the first voltage sensor or the second voltage sensor, the upper arm of the step-up converter is maintained in the ON state, the inverter is controlled in the PWM control mode, and a vehicle speed is equal to or greater than a predetermined vehicle speed. With this vehicle, it is possible to curb starting of the step-up operation at a time at which the step-up operation of the step-up converter is not necessary.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
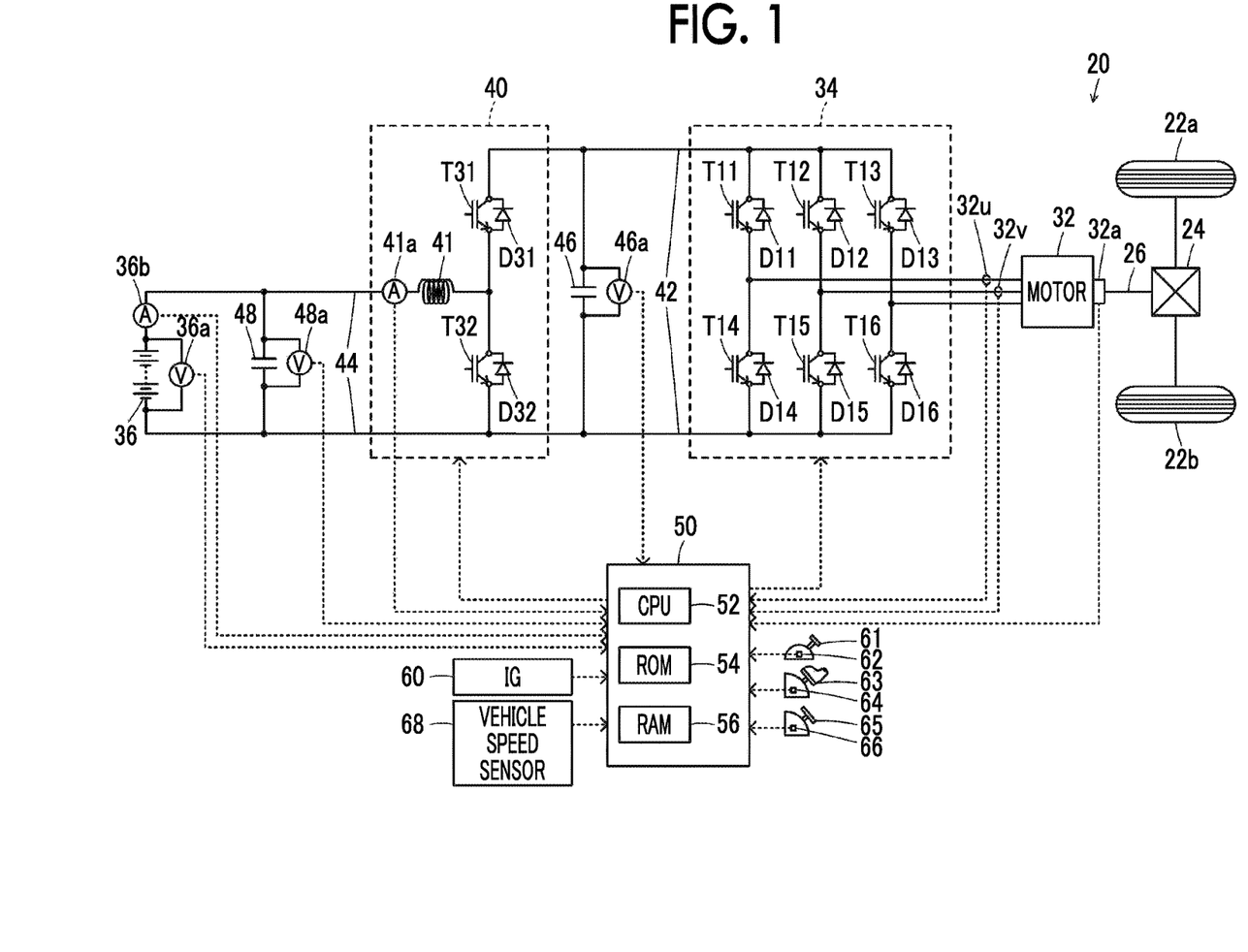
FIG. 1 is a diagram schematically illustrating a configuration of an electric vehicle according to an embodiment of the disclosure.

FIG. 1 is a diagram schematically illustrating a configuration of an electric vehicle 20 according to an embodiment of the disclosure. As illustrated in the drawing, the electric vehicle 20 according to the embodiment includes a motor 32, an inverter 34, a battery 36 serving as a power storage device, a step-up converter 40, and an electronic control unit 50.

The motor 32 is configured as a three-phase synchronous generator motor and includes a rotor that has a permanent magnet embedded therein and a stator on which three-phase coils are wound. The rotor of the motor 32 is connected to a drive shaft 26 which is connected to driving wheels 22*a* and 22*b* via a differential gear set 24.

The inverter 34 is used to drive the motor 32. The inverter 34 is connected to the step-up converter 40 via power lines 42 on a high voltage side and includes six transistors T11 to T16 and six diodes D11 to D16 that are connected in parallel to the six transistors T11 to T16. The transistors T11 to T16 are arranged in pairs of two transistors to serve as a source side and a sink side with respect to a positive electrode line and a negative electrode line of the power lines 42 on the high voltage side. Each junction between the transistors constituting a pair in the transistors T11 to T16 is connected to the corresponding three-phase coil (a U phase, a V phase, or a W phase) of the motor 32. Accordingly, when a voltage is applied to the inverter 34, an ON-time ratio of the transistors T11 to T16 constituting each pair is adjusted by the electronic control unit 50, whereby a rotating magnetic field is formed in the three-phase coils and the motor 32 is rotationally driven. A smoothing capacitor 46 is attached to the positive electrode line and the negative electrode line of the power lines 42 on the high voltage side.

The battery 36 is configured, for example, as a lithium-ion secondary battery or a nickel-hydride secondary battery and is connected to the step-up converter 40 via power lines 44 on a low voltage side. A smoothing capacitor 48 is attached to a positive electrode line and a negative electrode line of the power lines 44 on the low voltage side.

The step-up converter 40 is connected to the power lines 42 on the high voltage side and the power lines 44 on the low voltage side and includes two transistors T31 and T32, two diodes D31 and D32 that are connected in parallel to the two transistors T31 and T32, and a reactor L41. The transistor T31 is connected to the positive electrode line of the power lines 42 on the high voltage side. The transistor T32 is connected to the transistor T31 and the negative electrode lines of the power lines 42 on the high voltage side and the power lines 44 on the low voltage side. The reactor 41 is connected to a junction point between the transistors T31 and T32 and the positive electrode line of the power lines 44 on the low voltage side. When an ON-time ratio of the transistors T31 and T32 is adjusted by the electronic control unit 50, the step-up converter 40 performs a step-up operation of stepping up electric power of the power lines 44 on the low voltage side and supplying the stepped-up power to the power lines 42 on the high voltage side or a step-down operation of stepping down electric power of the power lines 42 on the high voltage side and supplying the stepped-down power to the power lines 44 on the low voltage side. Hereinafter, the transistor T31 of the step-up converter 40 is referred to as an "upper arm" and the transistor T32 is referred to as a "lower arm."

The electronic control unit 50 is configured as a microprocessor such as a CPU 52, and includes a ROM 54 that stores a processing program, a RAM 56 that temporarily stores data, and input and output ports in addition to the CPU 52. Signals from various sensors are input to the electronic control unit 50 via the input port. Examples of the signals input to the electronic control unit 50 include a rotational position θm from a rotational position sensor 32a (for example, a resolver) that detects a rotational position of the rotor of the motor 32 and phase currents Iu and Iv from current sensors 32u and 32v that detect currents of phases flowing in the motor 32. Examples thereof further include a voltage Vb of the battery 36 from a voltage sensor 36a that is attached between the terminals of the battery 36 and a current Ib of the battery 36 from a current sensor 36b that is attached to the output terminal of the battery 36. Examples thereof further include a voltage VH of the capacitor 46 (the power lines 42 on the high voltage side) from a voltage sensor 46a that is attached between the terminals of the capacitor 46, a voltage VL of the capacitor 48 (the power lines 44 on the low voltage side) from a voltage sensor 48a that is attached between the terminals of the capacitor 48, and a current IL of the reactor 41 from a current sensor 41a that detects a current flowing in the reactor 41. Examples thereof further include an ignition signal form an ignition switch 60 and a shift position SP from a shift position sensor 62 that detects an operation position of a shift lever 61. Examples thereof further include an accelerator operation amount Acc from an accelerator pedal position sensor 64 that detects an amount of depression of an accelerator pedal 63, a brake pedal position BP from a brake pedal position sensor 66 that detects an amount of depression of a brake pedal 65, and a vehicle speed V from a vehicle speed sensor 68.

Various control signals are output from the electronic control unit 50 via the output port. Examples of the signals output from the electronic control unit 50 include switching control signals for the transistors T11 to T16 and of the inverter 34 and switching control signals for the transistors T31 and T32 of the step-up converter 40. The electronic control unit 50 calculates an electrical angle θe, an angular velocity ωm, and a rotation speed Nm of the motor 32 based on the rotational position θm of the rotor of the motor 32 from the rotational position sensor 32a. The electronic control unit 50 calculates a state of charge SOC of the battery 36 based on an integrated value of the current Ib of the battery 36 from the current sensor 36b. The state of charge SOC refers to a ratio of capacity of electric power which can be discharged from the battery 36 to the total capacity of the battery 36. In the following description, the voltage Vb of the battery 36 that is detected by the voltage sensor 36a is referred to as a "detected voltage Vbdet," the voltage VH of the capacitor 46 (the power lines 42 on the high voltage side) that is detected by the voltage sensor 46a is referred to as a "detected voltage VHdet," the voltage VL of the capacitor 48 (the power lines 44 on the low voltage side) that is detected by the voltage sensor 48a is referred to as a "detected voltage VLdet," and the current IL of the reactor 41 that is detected by the current sensor 41a is referred to as a "detected current ILdet."

In the electric vehicle 20 according to the embodiment having the above-mentioned configuration, the electronic control unit 50 sets a required torque Td* required for the drive shaft 26 based on the accelerator operation amount Acc from the accelerator pedal position sensor 64 and the vehicle speed V from the vehicle speed sensor 68, sets the set required torque Td* as a torque command Tm* for the motor 32, and performs switching control of the transistors T11 to T16 of the inverter 34 such that the motor 32 is driven in accordance with the torque command Tm*. The electronic control unit 50 sets a target voltage VH* for the power lines 42 on the high voltage side such that the motor 32 is driven in accordance with the torque command Tm*, and performs switching control of the transistors T11 to T16 such that a difference between the detected voltage VHdet of the power lines 42 on the high voltage side from the voltage sensor 46a and the target voltage VH* is cancelled.

Control of the inverter 34 will be described below. In the embodiment, the inverter 34 is controlled in one control mode of a sinusoidal pulse width modulation (PWM) control mode, an over-modulation PWM control mode, and a rectangular wave control mode. The sinusoidal PWM control mode is a control mode in which the inverter 34 is controlled such that a pseudo three-phase AC voltage is applied (supplied) to the motor 32, and a modulation factor Rm at that time has a value ranging from about 0 to about 0.61. A modulation factor Rm refers to a ratio of effective values of an output voltage (an application voltage to the motor 32) to an input voltage of the inverter 34 (the voltage of the power lines 42 on the high voltage side). The over-modulation PWM control mode is a control mode in which the inverter 34 is controlled such that an over-modulation voltage is applied to the motor 32, and the modulation factor Rm at that time has a value ranging from about 0.61 to about 0.78. The rectangular wave control mode is a control mode in which the inverter 34 is controlled such that a rectangular wave voltage is applied to the motor 32, and the modulation factor Rm at that time has a value of about 0.78. In the embodiment, the inverter 34 is controlled in one control mode of the sinusoidal PWM control mode, the over-modulation PWM control mode, and the rectangular wave control mode based on the modulation factor Rm.

In the PWM control mode (the sinusoidal PWM control mode or the over-modulation PWM control mode), on the premise that the sum of phase currents Iu, Iv, and Iw of the phases (a U phase, a V phase, and a W phase) of the motor 32 is a value of zero, the electronic control unit 50 coordinate-converts the phase currents Iu and Iv of the U phase and the V phase into currents Id and Iq of a d axis and a q axis using the electrical angle θe of the motor 32 (three-two phase conversion). Subsequently, the electronic control unit 50 sets current commands Id* and Iq* of the d axis and the q axis based on the torque command Tm* for the motor 32 and sets voltage commands Vd* and Vq* of the d axis and the q axis using the current commands Id* and Iq* and the currents Id and Iq of the d axis and the q axis. The electronic control unit 50 coordinate-converts the voltage commands Vd* and Vq* of the d axis and the q axis into voltage commands (modulated waves) Vu*, Vv*, and Vw* of the phases using the electrical angle θe of the motor 32 (two-three phase conversion), and generates PWM signals for the transistors T11 to T16 by comparison of carrier waves (triangular waves) with the voltage commands Vu*, Vv*, and Vw* of the phases. Then, the electronic control unit 50 performs switching of the transistors T11 to T16 by outputting the PWM signals to the inverter 34.

In the rectangular wave control mode, the electronic control unit 50 first coordinate-converts the phase currents Iu and Iv of the U phase and the V phase into the currents Id and Iq of the d axis and the q axis (three-two phase conversion) using the electrical angle θe of the motor 32 as described above. Subsequently, the electronic control unit 50 sets an output torque Tmest which is estimated to be output from the motor 32 based on the currents Id and Iq of the d axis and the q axis. The, the electronic control unit 50 sets a voltage phase command θp* such that a difference between the output torque Tm and the torque command Tm* for the motor 32 is cancelled, and generates rectangular wave signals for the transistors T11 to T16 such that a rectangular wave voltage based on the set voltage phase command θp* is applied to the motor 32. Then, the electronic control unit 50 performs switching control of the transistors T11 to T16 of the inverter 34 by outputting the rectangular wave signals to the inverter 34.

Control of the step-up converter 40 will be described below. In the control of the step-up converter 40, when the target voltage VH* of the power lines 42 on the high voltage side is set as described above, a target duty ratio D* of the step-up converter 40 is set by Equation (1) using the detected voltage VLdet of the power lines 44 on the low voltage side from the voltage sensor 48a, the detected voltage VHdet of the power lines 42 on the high voltage side from the voltage sensor 46a, and the target voltage VH* of the power lines 42 on the high voltage side. Equation (1) is a relational expression in feedback control for cancelling the difference between the detected voltage VHdet and the target voltage VH* of the power lines 42 on the high voltage side, the first term of the right side denotes a feed-forward term, the second term of the right side denotes a proportional term in a feedback term, and the third term of the right side denotes an integral term in a feedback term. In Equation (1), "Kp" denotes a gain of the proportional term, and "Ki" denotes a gain of the integral term. The target duty ratio D* is a target value of a duty ratio D which is a ratio of an ON time Ton to the sum of an ON time Ton and an OFF time Toff (hereinafter referred to as a "carrier period Tc") of the upper arm (the transistor T31) of the step-up converter 40. Switching control of the transistors T31 and T32 of the step-up converter 40 is performed using the target duty ratio D* of the step-up converter 40.

$$D^* = VLdet/VH^* + Kp \times (VH^* - VHdet) + Ki \times \int (VH^* - VHdet) dt \quad (1)$$

Figure 2:
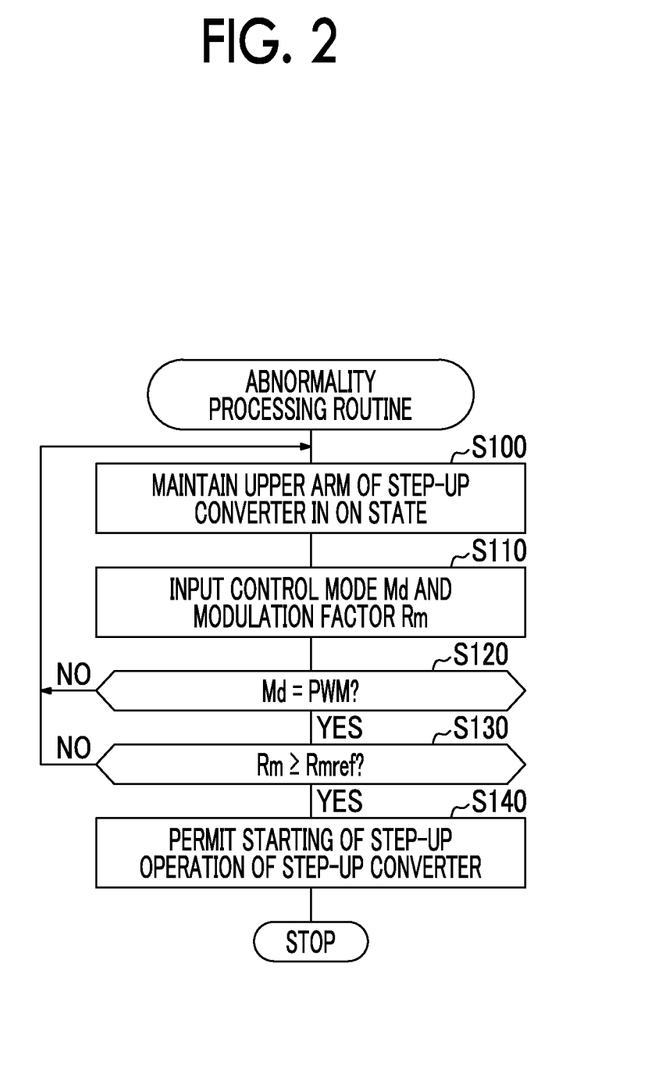
FIG. 2 is a flowchart illustrating an example of an abnormality processing routine which is performed by an electronic control unit illustrated in FIG. 1.

The operation of the electric vehicle 20 according to the embodiment having the above-mentioned configuration, particularly, the operation when an abnormality has occurred in the voltage sensor 46a that detects the voltage of the capacitor 46 (the power lines 42 on the high voltage side) or the voltage sensor 48a that detects the voltage of the capacitor 48 (the power lines 44 on the low voltage side), will be described below. FIG. 2 is a flowchart illustrating an example of an abnormality processing routine which is performed by the electronic control unit 50. This routine is performed when an abnormality occurs in the voltage sensor 46a or the voltage sensor 48a.

When the abnormality processing routine illustrated in FIG. 2 is performed, the electronic control unit 50 maintains the upper arm (the transistor T31) of the step-up converter 40 in an ON state (Step S100). When the upper arm of the step-up converter 40 is maintained in the ON state, the step-up converter 40 does not perform any of the step-up operation and the step-down operation and thus an actual voltage Vbact of the battery 36, an actual voltage VLact of the power lines 44 on the low voltage side, and an actual voltage VHact of the power lines 42 on the high voltage side are considered to be substantially equal to each other.

Subsequently, a control mode Md of the inverter 34 or a modulation factor Rm is input (Step S110). It is assumed that the current control mode out of the PWM control mode (the sinusoidal PWM control mode or the over-modulation PWM control mode) and the rectangular wave control mode is input as the control mode Md of the inverter 34. It is assumed that a value calculated by the above-mentioned method is input as the modulation factor Rm of the motor 32. However, since an abnormality occurs in the voltage sensor 46a, the modulation factor Rm cannot be calculated using the detected voltage VHdet of the power lines 42 on the high voltage side from the voltage sensor 46a. Accordingly, the modulation factor Rm is calculated and input using the detected voltage Vbdet of the battery 36 from the voltage sensor 36a instead of the detected voltage VHdet of the power lines 42 on the high voltage side based on the knowledge that the actual voltage Vbact of the battery 36 and the actual voltage VHact of the power lines 42 on the high voltage side are substantially equal to each other due to maintenance of the upper arm (the transistor T31) of the step-up converter 40 in the ON state. In this case, the control mode Md of the inverter 34 is switched based on the modulation factor Rm.

The control mode Md of the inverter 34 is ascertained (Step S120), and the modulation factor Rm is compared with a threshold value Rmref when the control mode Md of the inverter 34 is the PWM control mode (Step S130). Here, the threshold value Rmref can be set to a value which is slightly smaller than the modulation factor (substantially the value of 0.78) at which the control mode Md of the inverter 34 is switched from the PWM control mode to the rectangular wave control mode, for example, a value of 0.760, 0.765, or 0.770.

When it is ascertained in Step S120 that the control mode Md is the rectangular wave control mode or when it is ascertained in Step S120 that the control mode Md is the PWM control mode and it is determined in Step S130 that the modulation factor Rm is less than the threshold value Rmref, the upper arm (the transistor T31) of the step-up converter 40 is maintained in the ON state in Step S100 without permitting starting of the step-up operation of the step-up converter 40. When it is ascertained in Step S120 that the control mode Md is the PWM control mode and it is determined in Step S130 that the modulation factor Rm is equal to or greater than the threshold value Rmref, starting of the step-up operation of the step-up converter 40 is permitted (Step S140) and then this routine ends.

When the inverter 34 is controlled in the rectangular wave control mode, controllability becomes lower than that when the inverter 34 is controlled in the PWM control mode. When the step-up operation of the step-up converter 40 is started, there is a likelihood that the actual voltage VHact of the power lines 42 on the high voltage side will vary relatively greatly. Accordingly, when the inverter 34 is controlled in the rectangular wave control mode and the step-up operation of the step-up converter 40 is started, there is a likelihood that controllability of the motor 32 will become lower. In consideration of these circumstances, in the embodiment, starting of the step-up operation of the step-up converter 40 is permitted when the inverter 34 is controlled in the PWM control mode. Accordingly, it is possible to secure the controllability of the motor 32 to a certain extent.

When the inverter 34 is controlled in the PWM control mode and the modulation factor Rm is not greater as so much, the inverter 34 can be controlled in the PWM control mode such that the motor 32 is driven in accordance with the torque command Tm* without performing the step-up operation of the step-up converter 40. In consideration of these circumstances, in the embodiment, starting of the step-up operation of the step-up converter 40 is not permitted when the modulation factor Rm is less than the threshold value Rmref, that is, when it is not necessary to start the step-up operation of the step-up converter 40. Accordingly, it is possible to prevent the step-up operation from being started at a time at which it is not necessary to perform the step-up operation of the step-up converter 40.

Figure 3:
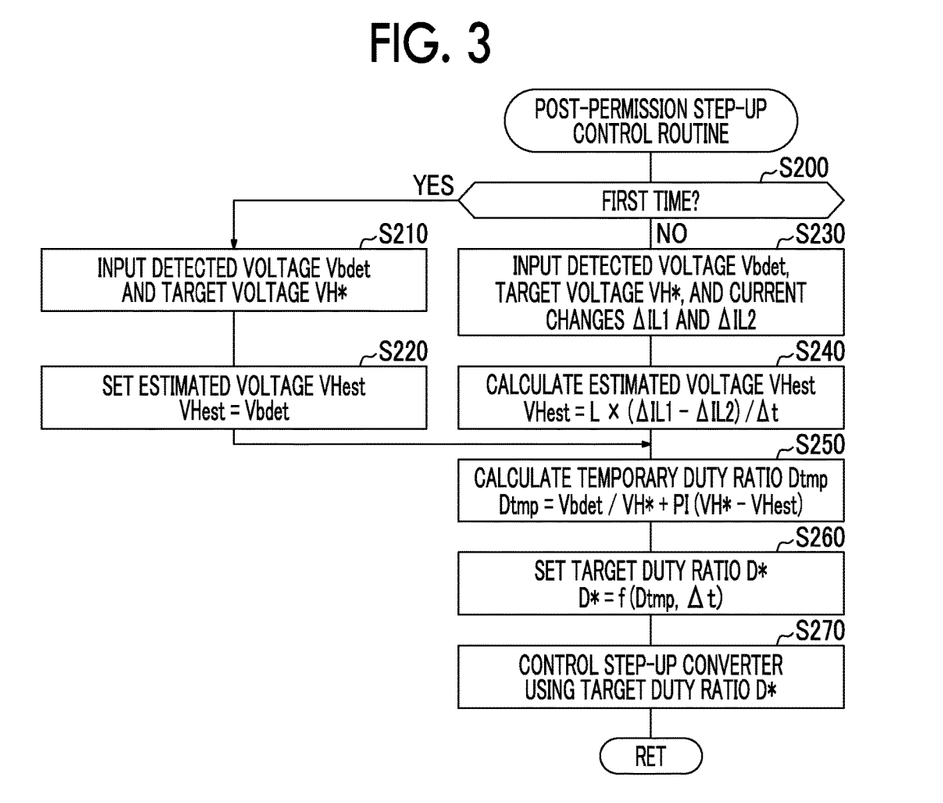
FIG. 3 is a flowchart illustrating an example of a post-permission step-up control routine which is performed by the electronic control unit.

The operation when starting of the step-up operation of the step-up converter 40 is permitted in the abnormality processing routine illustrated in FIG. 2 will be described below. FIG. 3 is a flowchart illustrating an example of a post-permission step-up control routine which is performed by the electronic control unit 50. This routine is repeatedly performed after starting of the step-up operation of the step-up converter 40 has been permitted in the abnormality processing routine illustrated in FIG. 2.

When the post-permission step-up control routine illustrated in FIG. 3 is performed, the electronic control unit 50 determines whether this routine has been performed at the first time (immediately after starting of the step-up operation of the step-up converter 40 has been permitted in the abnormality processing routine illustrated in FIG. 2) (Step S200). When it is determined that this routine has been performed at the first time, the detected voltage Vbdet of the battery 36 or the target voltage VH* of the power lines 42 on the high voltage side is input (Step S210). Here, it is assumed that a value detected by the voltage sensor 36a is input as the detected voltage Vbdet of the battery 36. As described above, it is also assumed that a value set based on the torque command Tm* of the motor 32 is input as the target voltage VH* of the power lines 42 on the high voltage side.

When data is input in this way, the detected voltage Vbdet of the battery 36 is set as the estimated voltage VHest of the power lines 42 on the high voltage side (Step S220). This is because the actual voltage Vbact of the battery 36, the actual voltage VLact of the power lines 44 on the low voltage side, and the actual voltage VHact of the power lines 42 on the high voltage side are considered to be equal to each other immediately before the step-up operation of the step-up converter 40 is started as described above. When the estimated voltage VHest of the power lines 42 on the high voltage side is acquired through the process of Step S220 or the process of Step S240 which will be described later, the control mode Md of the inverter 34 is determined based on the modulation factor Rm which is calculated using the estimated voltage VHest of the power lines 42 on the high voltage side instead of the detected voltage VHdet of the power lines 42 on the high voltage side.

Subsequently, a temporary duty ratio Dtmp of the step-up converter 40 is calculated by Equation (2) using the detected voltage Vbdet of the battery 36 and the target voltage VH* and the estimated voltage VHest of the power lines 42 on the high voltage side (Step S250). Here, Equation (2) corresponds to an equation in which "D*" in the left side of Equation (1) is replaced with "Dtmp" and "VLdet" and "VHdet" in the right side are replaced with "Vbdet" and "VHest."

$$Dtmp = Vbdet/VH^* + Kp \times (VH^* - VHest) + Ki \times \int (VH^* - VHest) dt \qquad (2)$$

The target duty ratio D* of the step-up converter 40 is set using the temporary duty ratio Dtmp of the step-up converter 40 and a unit time Δt (Step S260), switching control of the transistors T31 and T32 of the step-up converter 40 is performed using the set target duty ratio D* (Step S270), and then this routine ends. Here, an acquisition interval of the detected current ILdet of the reactor 41 is used as the unit time Δt in this embodiment. In the embodiment, the target duty ratio D* of the step-up converter 40 is set by applying upper and lower limits to the temporary duty ration Dtmp such that both the ON time Ton and the OFF time Toff of the upper arm (the transistor T31) are longer than the unit time Δt.

Figure 4:
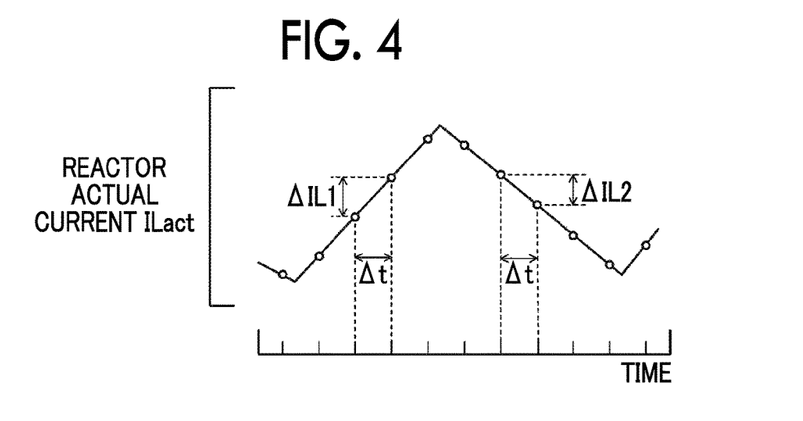
FIG. 4 is a diagram illustrating an actual current of a reactor illustrated in FIG. 1, a unit time, and a change of a detected current of the reactor.

When it is determined in Step S200 that this routine has not been performed at the first time, the detected voltage Vbdet of the battery 36, the target voltage VH* of the power lines 42 on the high voltage side, changes ΔIL1 and ΔIL2 of the detected current ILdet of the reactor 41, and the like are input (Step S230). The method of inputting the detected voltage Vbdet of the battery 36 and the target voltage VH* of the power lines 42 on the high voltage side is the same as described above. Values calculated as changes ΔIL1 and ΔIL2 of the detected current ILdet (the actual current ILact) of the reactor 41 per unit time Δt in increase or decrease of the detected current are input as the changes ΔIL1 and ΔIL2 of the detected current ILdet of the reactor 41. FIG. 4 is a diagram illustrating the actual current ILact of the reactor 41, the unit time Δt, and the changes ΔIL1 and ΔIL2 of the detected current ILdet of the reactor 41. In the drawing, a solid line denotes the actual current ILact of the reactor 41, white circles denote acquisition times of the detected current ILdet of the reactor 41 and the detected current ILdet of the reactor 41 at the times.

When data is input in this way, the estimated voltage VHest of the power lines 42 on the high voltage side is calculated by Equation (3) using the changes ΔIL1 and ΔIL2 of the detected current ILdet of the reactor 41, the unit time Δt, and inductance L of the reactor 41 (Step S240). Equation (3) is obtained as follows. When the actual current ILact of the reactor 41 increases, a slope 51 of the actual current ILact of the reactor 41, the actual voltage VLact of the power lines 44 on the low voltage side, and the inductance L of the reactor 41 establish Equation (4). When the actual current ILact of the reactor 41 decreases, a slope S2 of the actual current ILact of the reactor 41, the actual voltage VHact of the power lines 42 on the high voltage side, the actual voltage VLact of the power lines 44 on the low voltage side, and the inductance L of the reactor 41 establish Equation (5). Then, Equation (3) is obtained by replacing the slopes S1 and S2 of Equations (4) and (5) with "ΔIL1/5" and "ΔIL2/t", replacing "VHact" in Equation (5) with "VHest," and arranging the two equations.

$$VHest = L \times (\Delta IL1 - \Delta IL2)/\Delta t \quad (3)$$

$$S1 = VLact/L \quad (4)$$

$$S2 = -(VHact - VLact)/L \quad (5)$$

Subsequently, the target duty ratio D* of the step-up converter 40 is set and switching control of the transistors T31 and T32 of the step-up converter 40 is performed using the target duty ratio D* through the processes of Steps S250 to S270, and then this routine ends.

When an abnormality occurs in the voltage sensor 46a that detects the voltage of the capacitor 46 (the power lines 42 on the high voltage side) or the voltage sensor 48a that detects the voltage of the capacitor 48 (the power lines 44 on the low voltage side), it is possible to acquire the estimated voltage VHest of the power lines 42 on the high voltage side and to appropriately perform the step-up operation of the step-up converter 40 through the control. The actual current ILact of the reactor 41 of the step-up converter 40 increases or decreases depending on ON or OFF of the upper arm (the transistor T31) and the lower arm (the transistor T32) of the step-up converter 40. In the embodiment, it is possible to appropriately calculate the changes ΔIL1 and ΔIL2 of the detected current ILdet of the reactor 41 by setting the target duty ratio D* of the step-up converter 40 such that both the ON time Ton and the OFF time Toff of the upper arm (the transistor T31) of the step-up converter 40 are longer than the unit time Δt (the acquisition interval of the detected current ILdet of the reactor 41) as described above.

Figure 5:
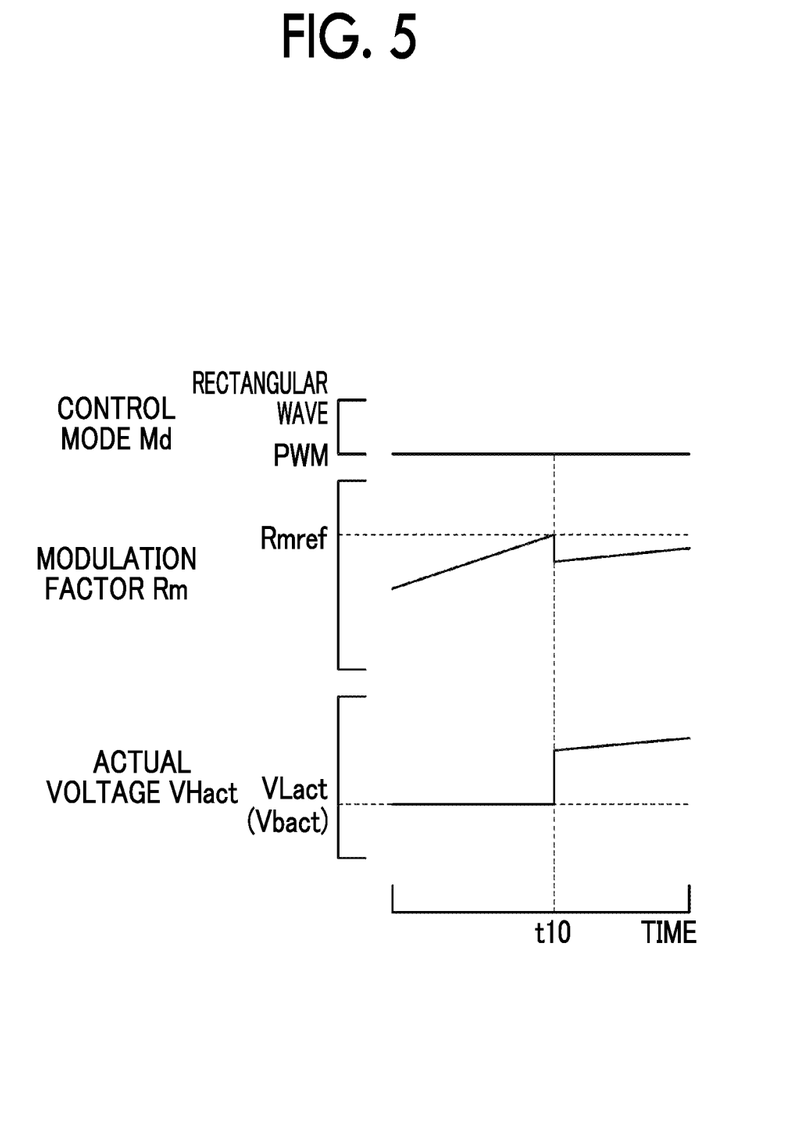
FIG. 5 is a diagram illustrating an example of a state after maintenance of transistors in an upper arm of a step-up converter in an ON state is started due to occurrence of an abnormality in voltage sensors illustrated in FIG. 1.

FIG. 5 is a diagram illustrating an example of a state after maintenance of the upper arm (the transistor T31) of the step-up converter 40 in the ON state is started when an abnormality has occurred in the voltage sensor 46a or the voltage sensor 48a. As illustrated in the drawing, when the control mode Md of the inverter 34 is the PWM control mode and the modulation factor Rm is equal to or greater than the threshold value Rmref (time t10), the step-up operation of the step-up converter 40 is started. Accordingly, it is possible to curb deterioration in controllability of the motor 32 in comparison with a case in which the step-up operation of the step-up converter 40 is started when the control mode Md of the inverter 34 is the rectangular wave control mode. When the control mode Md of the inverter 34 is the PWM control mode, it is possible to prevent the step-up operation from being started at a time at which the step-up operation of the step-up converter 40 is not necessary in comparison with a case in which the step-up operation of the step-up converter 40 is started regardless of the modulation factor Rm. Since the actual voltage VHact (the estimated voltage VHest) of the power lines 42 on the high voltage side increases due to starting of the step-up operation of the step-up converter 40, the modulation factor Rm decreases. When the step-up operation of the step-up converter 40 is performed, the estimated voltage VHest of the power lines 42 on the high voltage side is calculated based on the detected current ILdet of the reactor 41 and the step-up converter 40 is controlled using the calculated estimated voltage VHest as described above. Accordingly, it is possible to appropriately perform the step-up operation of the step-up converter 40 even when an abnormality occurs in the voltage sensor 46a or the voltage sensor 48a.

In the electric vehicle 20 according to the embodiment, when an abnormality occurs in the voltage sensor 46a or the voltage sensor 48a, the estimated voltage VHest of the power lines 42 on the high voltage side is calculated based on the detected current ILdet of the reactor 41 from the current sensor 41a and the step-up converter 40 is controlled using the calculated estimated voltage VHest. Accordingly, it is possible to appropriately perform the step-up operation of the step-up converter 40 even when an abnormality occurs in the voltage sensor 46a or the voltage sensor 48a.

In the electric vehicle 20 according to the embodiment, the upper arm (the transistor T31) of the step-up converter 40 is maintained in the ON state when an abnormality occurs in the voltage sensor 46a or the voltage sensor 48a, and the step-up operation of the step-up converter 40 is started when the upper arm of the step-up converter 40 is maintained in the ON state, the control mode Md of the inverter 34 is the PWM control mode, and the modulation factor Rm is equal to or greater than the threshold value Rmref. Accordingly, in comparison with a case in which the step-up operation of the step-up converter 40 is started when the control mode Md of the inverter 34 is the rectangular wave control mode, it is possible to curb deterioration in controllability of the motor 32. In comparison with a case in which the step-up operation of the step-up converter 40 is started regardless of the modulation factor Rm when the upper arm of the step-up converter 40 is maintained in the ON state and the control mode Md of the inverter 34 is the PWM control mode, it is possible to prevent the step-up operation from being started at a time at which the step-up operation of the step-up converter 40 is not necessary.

Figure 6:
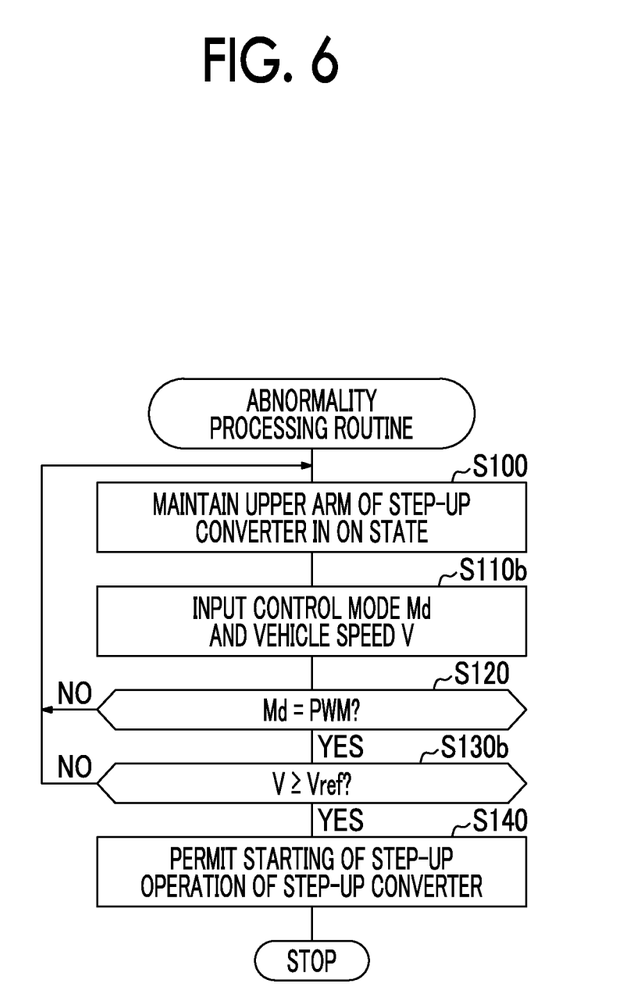
FIG. 6 is a flowchart illustrating an example of an abnormality processing routine according to a modified example of the embodiment of the disclosure.

In the electric vehicle 20 according to the embodiment, the upper arm of the step-up converter 40 is maintained in the ON state (Step S100) when an abnormality occurs in the voltage sensor 46a or the voltage sensor 48a as described above with reference to the abnormality processing routine illustrated in FIG. 2, the control mode Md of the inverter 34 and the modulation factor Rm are input (Step S110), and starting of the step-up operation of the step-up converter 40 is permitted (Step S140) when the control mode Md of the inverter 34 is the PWM control mode and the modulation factor Rm is equal to or greater than the threshold value Rmref (Steps S120 and S130). However, as described in an abnormality processing routine according to a modified example illustrated in FIG. 6, the upper arm of the step-up converter 40 may be maintained in the ON state (Step S100), the control mode Md of the inverter 34 and the vehicle speed V from the vehicle speed sensor 68 may be input (Step S110b), and starting of the step-up operation of the step-up converter 40 may be permitted (Step S140) when the control mode Md of the inverter 34 is the PWM control mode and the vehicle speed V is equal to or greater than a threshold value Vref (Steps S120 and S130b). Here, as the threshold value Vref, a value which is slightly lower than a vehicle speed at which the control mode Md of the inverter 34 is switched from the PWM control mode to the rectangular wave control mode when the upper arm (the transistor T31) of the step-up converter 40 is maintained in the ON state, for example, a vehicle speed V at which the modulation factor Rm is considered to be equal to the threshold value Rmref, can be used. The control mode Md of the inverter 34 is switched depending on the modulation factor Rm as described above but, generally, the rotation speed Nm of the motor 32 is likely to increase and the modulation factor Rm is likely to increase as the vehicle speed V increases. Accordingly, comparison of the vehicle speed V with the threshold value Vref may be used instead of comparison of the modulation factor Rm with the threshold value Rmref.

In the electric vehicle 20 according to the embodiment, the step-up operation of the step-up converter 40 is started when an abnormality occurs in the voltage sensor 46a or the voltage sensor 48a, the upper arm of the step-up converter 40 is maintained in the ON state, the control mode Md of the inverter 34 is the PWM control mode, and the modulation factor Rm is equal to or greater than the threshold value Rmref.

In the above-mentioned modified example, the step-up operation of the step-up converter 40 is started when an abnormality occurs in the voltage sensor 46a or the voltage sensor 48a, the upper arm of the step-up converter 40 is maintained in the ON state, the control mode Md of the inverter 34 is the PWM control mode, and the vehicle speed V is equal to or greater than the threshold value Vref. However, the step-up operation of the step-up converter 40 may be started regardless of the modulation factor Rm or the vehicle speed V when the upper arm of the step-up converter 40 is maintained in the ON state and the control mode Md of the inverter 34 is the PWM control mode. The step-up operation of the step-up converter 40 may be started regardless of the control mode Md of the inverter 34 when the upper arm of the step-up converter 40 is maintained in the ON state.

In the electric vehicle 20 according to the embodiment, the upper arm of the step-up converter 40 is temporarily maintained in the ON state when an abnormality occurs in the voltage sensor 46a or the voltage sensor 48a, and the step-up operation of the step-up converter 40 is started when the upper arm of the step-up converter 40 is maintained in the ON state, the control mode Md of the inverter 34 is the PWM control mode, and the modulation factor Rm is equal to or greater than the threshold value Rmref. However, when the step-up operation of the step-up converter 40 is being started and an abnormality occurs in the voltage sensor 46a or the voltage sensor 48a, calculation of the estimated voltage VHest of the power lines 42 on the high voltage side may be started immediately without maintaining the upper arm of the step-up converter 40 in the ON state (without stopping the step-up operation) and the step-up operation of the step-up converter 40 may continue to be performed.

In the electric vehicle 20 according to the embodiment, when an abnormality occurs in the voltage sensor 46a or the voltage sensor 48a, the temporary duty ratio Dtmp of the step-up converter 40 is set by Equation (2) and the target duty ratio D* of the step-up converter 40 is set based on the temporary duty ration Dtmp. However, in Equation (2), a predetermined voltage Vb1 may be used instead of the detected voltage Vbdet of the battery 36. Here, a voltage which is determined as the voltage of the battery 36 when the state of charge SOC of the battery 36 has a certain value (for example, 50%) by experiment or analysis can be used as the predetermined voltage Vb1.

In the electric vehicle 20 according to the embodiment, the battery 36 is used as the power storage device, but a capacitor may be used instead of the battery 36.

Figure 7:
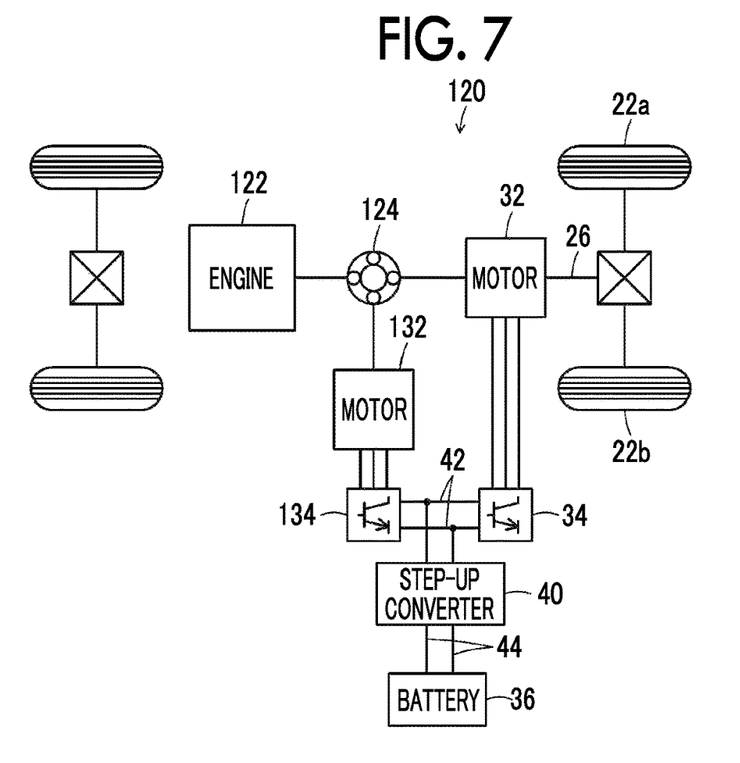
FIG. 7 is a diagram schematically illustrating a configuration of a hybrid vehicle which is a modified example of the vehicle according to the embodiment of the disclosure.
Figure 8:
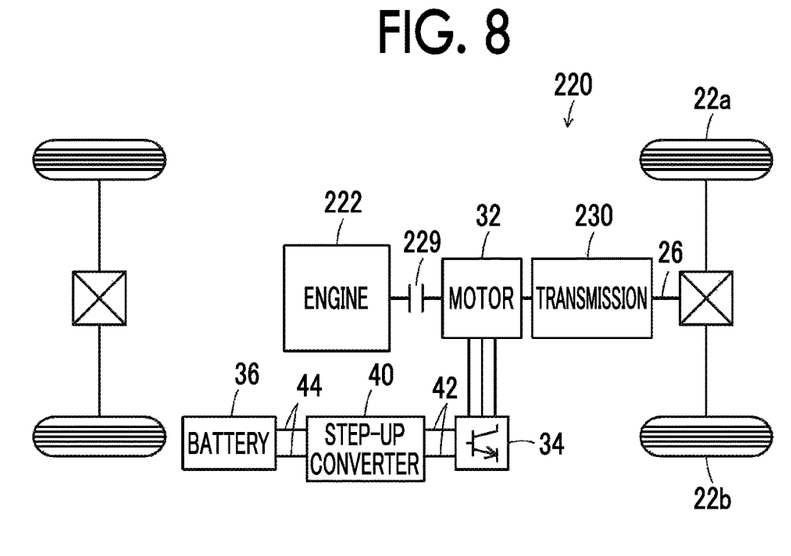
FIG. 8 is a diagram schematically illustrating a configuration of a hybrid vehicle which is another modified example of the vehicle according to the embodiment of the disclosure.

In the embodiment, as illustrated in FIG. 1, the configuration of the electric vehicle 20 in which the motor 32 is connected to the drive shaft 26 connected to the driving wheels 22a and 22b is employed. However, as illustrated in FIG. 7, a configuration of a hybrid vehicle 120 in which the motor 32 is connected to the drive shaft 26 connected to the driving wheels 22a and 22b and an engine 122 and a motor 132 are connected to the drive shaft 26 via a planetary gear set 124 may be employed. In this case, the motor 132 is driven by an inverter 134 which is connected to the power lines 42 on the high voltage side. As illustrated in FIG. 8, a configuration of a hybrid vehicle 220 in which a transmission 230 is provided between the drive shaft 26 connected to the driving wheels 22a and 22b and the motor 32 and an engine 222 is connected to the motor 32 via a clutch 229 may be employed.

Correspondence between principal elements of the embodiment and principal elements of the disclosure described in the SUMMARY will be described below. In the embodiment, the motor 32 is an example of the "motor." The inverter 34 is an example of the "inverter." The battery 36 is an example of the "power storage device." The step-up converter 40 is an example of the "step-up converter." The voltage sensor 46a is an example of the "first voltage sensor." The voltage sensor 48a is an example of the "second voltage sensor." The current sensor 41a is an example of the "current sensor." The electronic control unit 50 is an example of the "electronic control unit."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY. That is, it should be noted that the disclosure described in the SUMMARY is to be construed based on the description of the SUMMARY and the embodiment is only a specific example of the disclosure described in the SUMMARY.

While an embodiment of the disclosure has been described above, the disclosure is not limited to the embodiment and can be modified in various forms without departing from the gist of the disclosure.

The disclosure is applicable in the vehicle manufacturing industry and the like.

What is claimed is:
1. A vehicle comprising:
   a motor configured to drive the vehicle;
   an inverter configured to drive the motor;
   a power storage device;
   a step-up converter including switching elements of an upper arm and a lower arm and a reactor, the step-up converter being configured to perform a step-up operation of stepping up electric power of a power line on a low voltage side connected to the power storage device and supplying the stepped-up electric power to a power line on a high voltage side connected to the inverter;
   a first voltage sensor configured to detect a voltage of the power line on the high voltage side;
   a second voltage sensor configured to detect a voltage of the power line on the low voltage side;
   a current sensor configured to detect a current of the reactor as a detected current; and
   an electronic control unit configured to:
   (i) control the inverter and the step-up converter,
   (ii) calculate an estimated voltage of the power line on the high voltage side based on the detected current of the reactor when an abnormality occurs in the first voltage sensor or the second voltage sensor, and
(iii) control the step-up converter using the estimated voltage of the power line on the high voltage side.

2. The vehicle according to claim 1, wherein the electronic control unit is configured to calculate the estimated voltage of the power line on the high voltage side based on changes of the detected current of the reactor per unit time in increase and decrease of the detected current when an abnormality occurs in the first voltage sensor or the second voltage sensor.

3. The vehicle according to claim 2, wherein the electronic control unit is configured to calculate the estimated voltage VHest of the power line on the high voltage side by "VHest=L×(ΔIL1−ΔIL2)/Δt" where "Δt" denotes the unit time, "ΔIL1" and "ΔIL2" denote the changes of the detected current of the reactor per unit time in increase and decrease of the detected current, "L" denotes inductance of the reactor, and "VHest" denotes the estimated voltage of the power line on the high voltage side.

4. The vehicle according to claim 2, wherein the electronic control unit is configured to:
(i) set a target duty ratio based on the estimated voltage and a target voltage of the power line on the high voltage side;
(ii) control the step-up converter using the target duty ratio; and
(iii) set the target duty ratio such that an ON time and an OFF time of the upper arm are longer than the unit time based on the estimated voltage and the target voltage of the power line on the high voltage side when an abnormality occurs in the first voltage sensor or the second voltage sensor.

5. The vehicle according to claim 1, wherein the electronic control unit is configured to:
(i) control the inverter in a PWM control mode or a rectangular wave control mode; and
(ii) control the step-up converter such that the upper arm is maintained in an ON state when an abnormality occurs in the first voltage sensor or the second voltage sensor and to start the step-up operation of the step-up converter when the upper arm of the step-up converter is maintained in the ON state and the inverter is controlled in the PWM control mode.

6. The vehicle according to claim 5, wherein the electronic control unit is configured to start the step-up operation of the step-up converter when an abnormality occurs in the first voltage sensor or the second voltage sensor, the upper arm of the step-up converter is maintained in the ON state, the inverter is controlled in the PWM control mode, and a modulation factor is equal to or greater than a predetermined modulation factor.

7. The vehicle according to claim 5, wherein the electronic control unit is configured to start the step-up operation of the step-up converter when an abnormality occurs in the first voltage sensor or the second voltage sensor, the upper arm of the step-up converter is maintained in the ON state, the inverter is controlled in the PWM control mode, and a vehicle speed is equal to or greater than a predetermined vehicle speed.

8. A control method for a vehicle, the vehicle including a motor configured to drive the vehicle, an inverter configured to drive the motor, a power storage device, a step-up converter including switching elements of an upper arm and a lower arm and a reactor, the step-up converter being configured to perform a step-up operation of stepping up electric power of a power line on a low voltage side connected to the power storage device and supplying the stepped-up electric power to a power line on a high voltage side connected to the inverter, a first voltage sensor configured to detect a voltage of the power line on the high voltage side, a second voltage sensor configured to detect a voltage of the power line on the low voltage side, and a current sensor configured to detect a current of the reactor as a detected current, the control method comprising:
(i) controlling the inverter and the step-up converter;
(ii) calculating an estimated voltage of the power line on the high voltage side based on the detected current of the reactor when an abnormality occurs in the first voltage sensor or the second voltage sensor; and
(iii) controlling the step-up converter using the estimated voltage of the power line on the high voltage side.

* * * * *